United States Patent
Lockhart et al.

(10) Patent No.: US 7,631,124 B2
(45) Date of Patent: Dec. 8, 2009

(54) APPLICATION-SPECIFIC MAPPING OF INPUT DEVICE ELEMENTS

(75) Inventors: Alice Lockhart, Seattle, WA (US); Vincent Ball, Kirkland, WA (US); Kevin Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 11/784,223

(22) Filed: Apr. 6, 2007

(65) Prior Publication Data
US 2008/0250429 A1 Oct. 9, 2008

(51) Int. Cl.
*G06F 13/12* (2006.01)
(52) U.S. Cl. ............... 710/62; 710/72; 710/73; 719/318
(58) Field of Classification Search .............. None
See application file for complete search history.

(56) References Cited

U.S. PATENT DOCUMENTS

| | | | | |
|---|---|---|---|---|
| 5,157,384 | A * | 10/1992 | Greanias et al. | 345/156 |
| 6,213,880 | B1 | 4/2001 | Sim | 463/37 |
| 6,535,931 | B1 | 3/2003 | Celi, Jr. | 710/1 |
| 6,615,299 | B1 | 9/2003 | Chu et al. | 710/65 |
| 6,862,017 | B2 | 3/2005 | Chen | 345/168 |
| 7,116,310 | B1 | 10/2006 | Evans et al. | 345/156 |
| 2002/0067338 | A1 | 6/2002 | Adan et al. | 345/156 |
| 2004/0104893 | A1 | 6/2004 | Huang | 345/168 |
| 2005/0073501 | A1 | 4/2005 | Chen | 345/163 |
| 2006/0080225 | A1 | 4/2006 | Lutnick et al. | 705/37 |
| 2006/0152495 | A1 * | 7/2006 | Gombert | 345/172 |
| 2007/0162875 | A1 * | 7/2007 | Paquette et al. | 715/847 |

OTHER PUBLICATIONS

Published by Microsoft Corporation, "Microsoft Mouse & Keyboard Software," http://www.microsoft.com/hardware/mouseandkeyboard/Software.mspx, prior Apr. 2007, pp. 1-2.
Published by Apple Inc., "Apple Accessibility-Physical/Motor," http://www.apple.com/accessibility/physical/, prior 2007, pp. 1-5.
Electronic Keyboards, Inc., "AutoCAD(r) Command Keyboard," http://www.electronickeyboards.com/autocad-keyboards.html, 1999, pp. 1-5.

* cited by examiner

*Primary Examiner*—Ilwoo Park
(74) *Attorney, Agent, or Firm*—Alan G. Rego; Westman, Champlin & Kelly P.A.

(57) ABSTRACT

A method for carrying out application-specific mapping of input device elements (for example, human input device buttons). The method includes, from an application matching program, determining, for an application program, whether a control element event (for example, a mouse button click event) needs to carry out an action that is specific to the application program, or to perform its default action. The application matching program is configured to execute independently of the application program. A computing system that is capable of carrying out the above method is also provided.

17 Claims, 6 Drawing Sheets

APPLICATION-SPECIFIC MAPPING OF INPUT DEVICE ELEMENTS

BACKGROUND

Different types of human input devices are available to allow a computer user to communicate with a computer. Personal computers usually offer input devices such as a keyboard and a mouse. Numerous other devices are available, such as trackballs, touch pads, joysticks and game pads. In general, when connected to a computer, human input devices allow a user to communicate information to the computer. The information communicated instructs software applications running on the computer to perform specified actions. More recently, mechanical control elements such as "specialized" buttons, on mice, keyboards, and other devices, have been employed to allow computer users to relatively rapidly perform frequent tasks. Having a particular "specialized" button behave in a similar manner in a variety of applications (for example, a Next button used to advance to a next screen in one application and to a next picture in another application) may require different functionality to be invoked in each of the different applications. Further, it may be desirable to provide more different kinds of functionality on a given device than the industrial design for the device allows for, in terms of number of buttons, for example. In either of these situations, a given button needs to be successfully mapped to a variety of functions, depending on what application is currently active.

The discussion above is merely provided for general background information and is not intended to be used as an aid in determining the scope of the claimed subject matter.

SUMMARY

A method for carrying out application-specific mapping of input device elements (for example, human input device buttons) is provided. The method includes, from an application matching program, determining, for an application program, whether a control element event (for example, a mouse button click event) needs to carry out an action that is specific to the application program, or to perform its default action. The application matching program is configured to execute independently of the application program (i.e., neither the application matching program or the application program are configured in any way to depend on the presence or absence of the other). Installing the application program (or, in general, any application program) on a particular computer before or after the application matching program is installed on the same computer will not in any way interfere with normal operation of the application matching program. A computing system that is capable of carrying out the above method is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present embodiments relate to application-specific mapping of control elements included in input devices.

Figure 1:
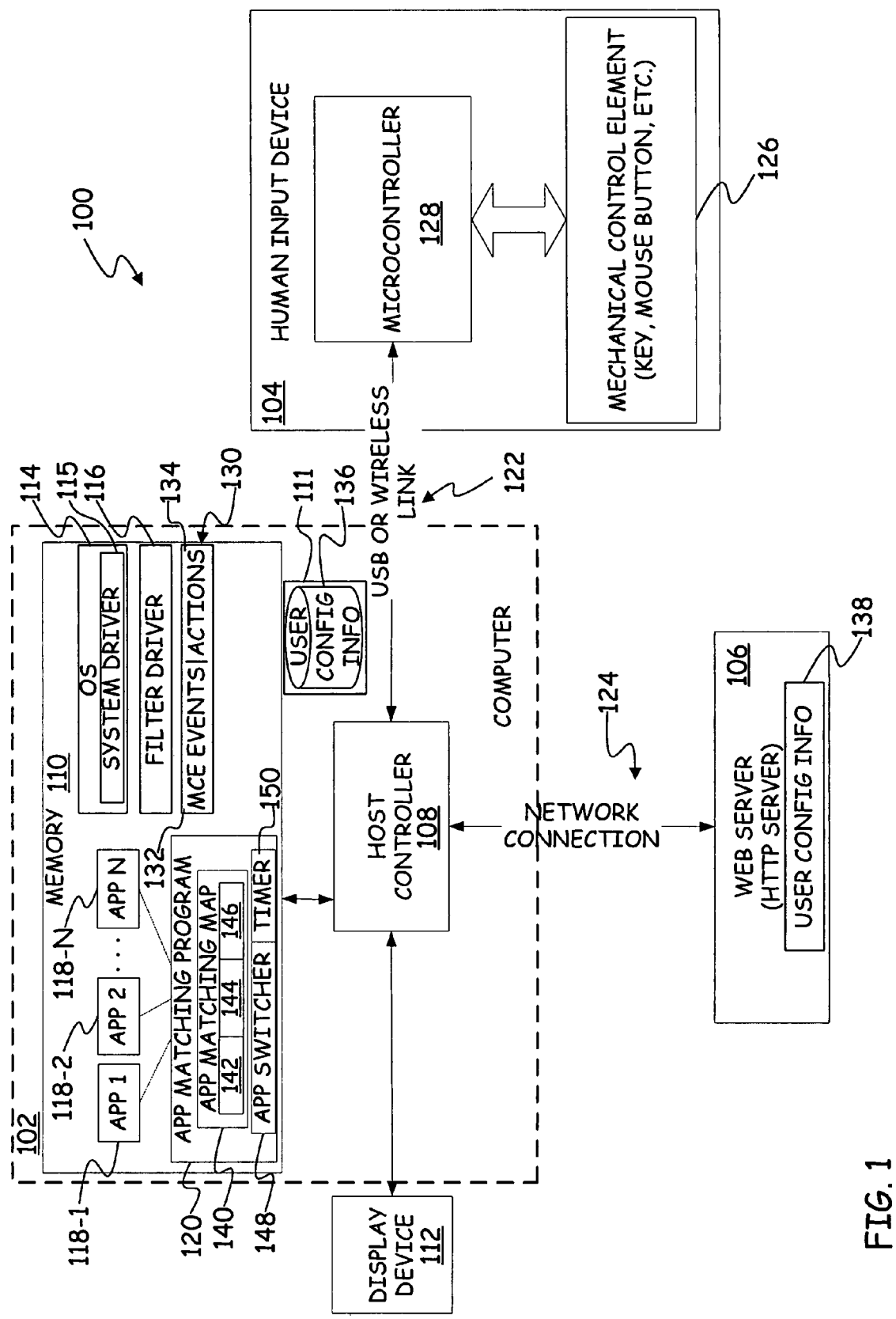
FIG. 1 is simplified block diagram of a computing system that includes one of the present embodiments.

FIG. 1 is a simplified block diagram of a computing system 100 in which application-specific mapping of a mechanical control element is carried out in accordance with one of the present embodiments. As can be seen in FIG. 1, computing system 100 includes computer 102, a human input device 104, a web server 106 and a display device 112.

In the example embodiment shown in FIG. 1, computer 102 includes, as its primary components, a host controller 108 and a memory 110. Memory 110 and display device 112 operate under the control of host controller 108. Memory 110 includes an operating system 114, a filter driver 116 (which may be specific to the human input device 104), various application programs (denoted by reference numerals 118-1, 118-2 and 118-N) and an application matching program 120. Host controller 108 can communicate with human input device 104 using any suitable type of wired (universal serial bus (USB), for example) or wireless link. Host controller 108 can communicate with server 106 using any suitable type of wired (Ethernet, for example) or wireless network link. In FIG. 1, the communication link between host controller 108 and human input device 104 is denoted by reference numeral 122 and the network connection between host controller 108 and web server 106 is denoted by reference numeral 124.

Human input device 104 (which can be a keyboard, a mouse, a touch pad, etc.), in general, when connected to a computer (such as 102), allows a user to communicate information to the computer. For simplification, in FIG. 1, human input device 104 is shown as including a single mechanical control element 126 (which can be a key, a button, etc.). However, in practice, human input device 104 will include several mechanical control elements, some or all of which can be mapped to functionality handled in user-level application programs. Also included in human input device 104 is a microcontroller 128 that is capable of detecting a status of mechanical control element 126 and communicating the status with computer 102. An active status of mechanical control element 126 (for example, a click, a press or a touch of element 126), which is communicated to computer 102 by microcontroller 128 is typically represented by, and stored as, a code in memory 110. A code that is representative of an active status of a mechanical control element (such as 126) is referred to herein as a mechanical control element event. For example, the pressing of a Next mouse button is represented, in memory 110, as a code and any accompanying information referred to herein as a Next mouse button event. Processing or handling of mechanical control element events and actions corresponding to the mechanical control elements can take place at multiple levels. Many mechanical control element events and their associated actions can be processed by a system driver 115, which is a part of operating system 114. In general, for a given human input device, there will be a driver (plus potentially additional associated drivers such as filter drivers), or more than one driver if it is a composite device (e.g., audio and video drivers for a webcam that includes a microphone). Depending on operating system and device design, some of these may be "default" system drivers, and others may be designed and shipped by the device manufacturer for installation and use with the device. However, for mouse and keyboard button events, a default system driver (such as 115) usually comes into play. Filter driver 116 includes functionality that allows for processing of device input before it is routed from system driver 115 to the rest of the system. In a specific embodiment, filter driver 116 can "capture" the event and, for example, execute a particular action for the event based on information stored in its cache (filter driver cache 130). As can be seen in FIG. 1, filter driver cache 130 includes mechanical control element events 132 and associated actions 134 for the events. It should be noted that, in general, for mechanical control elements that are mapped to functionality handled in user-level application programs, the filter drive cache 130 only indicates that the particular mechanical control event is handled in the application program and does not address the specific functionality that the application program provides for the particular mechanical control element event. Reasons for this are provided further below. It should also be noted that computing system 100 allows for user re-mapping of mechanical control element events. User re-mapping information is stored as user configuration information 136 in persistent storage 111, but can also be stored as user configuration information 138 on web server 106 from where it can be downloaded to any suitable computer. User configuration information in persistent storage 111 and on web server 106 are given different reference numbers because, at a minimum, they are different copies. In order to facilitate a better understanding of the present embodiments, a general description of how input devices (such as 104) generate events is provided below. This is followed by a description of how application-specific mapping of control elements included in input devices is handled in accordance with the present embodiments.

Input devices can generate native and non-native events. Native events are handled by the operating system and non-native events need software in addition to the operating system in order to operate. An example of a native event is the left mouse button. An example of a non-native event is the event generated by the Next mouse button, which was discussed earlier. Mechanical control elements such as mouse buttons can be remapped to different native events and non-native events. In order to make this re-mapping as efficient as possible, a filter driver (such as 116) operates at the kernel level and caches the mechanical control element to event mappings. There are three possible paths in the filter driver:

1) A native button (e.g. left mouse button) is not mapped to another native event or a non-native event. In this case, the filter driver (such as 116) passes the event through to the next filter driver in the chain and the default operating system driver (such as 115) handles the event.
2) A native button is mapped to a different native event. In this case, the filter driver 116 captures (blocks the event from passing through to the next filter driver in the chain) the original native event and injects the mapped native event in to the filter driver chain. The event is handled by the default operating system driver (such as 115).
3) A native button is mapped to a non-native event. The filter driver (such as 116) captures the original native event and the rest of the filters in the driver chain do not know that an event occurred. The filter driver (such as 116) then notifies the user-level component of the software that the non-native event needs to be handled.

As indicated earlier, certain "specialized" buttons, such as the Next mouse button, are employed to allow computer users to relatively rapidly perform frequent tasks. In contrast, as noted above, some buttons such as a left mouse button are not usually subjected to user or software customization. When designing a system for allowing user or software customization of the behavior of some mechanical control elements in certain situations, it is important that mechanical control elements, which are not customized, perform the default behaviors or actions as efficiently as possible. Alternatively, the mechanical control elements for which efficient behavior is mandated could, as indicated above, be swapped with other mechanical control elements (e.g. swap left and right mouse buttons). In this case as well, the button that now performs the task that needs to be done particularly efficiently should be handled in the driver. This means that mechanical control elements that are mapped to functions normally handled by system drivers (for example, left mouse click), should be handled by the system drivers (such as 115). For devices in which efficient kernel-level handling of native events is important (e.g. mice), filter driver 116 caches these mappings, and forwards mechanical control element events to the application matching software only for mechanical control elements that are, for a current application or according to user configuration, mapped to functionality handled in the user-level software. Because filter driver 116, like other drivers, operates in the kernel (where anything other than efficient performance would adversely affect performance of the whole system), it cannot and should not check for a currently active application as it will negatively impact efficiency. Therefore, separate software should track when user switches between applications, and update filter driver cache 130 of mechanical control event mappings on application switch. In the embodiment of FIG. 1, this separate software is application matching program 120, which detects each time a user switches from one application to another. On application switch, program 120 detects the current application and if the current application is one for which user or device software has re-mapped any events, updates filter driver cache 130 to indicate that those events that have re-mappings for this application should be handled non-natively.

In general, if it is determined that a user has not re-mapped a detected mechanical control element for either the current application or in general, program 120 checks its map (application matching map 140 that includes mechanical control element events 142 and corresponding application identifiers 144 and actions 146 for the events) to determine whether it needs to perform its default action or a different action that is specific to the current application. In one embodiment, application matching map 140 can be a table that can be updated by any suitable method. In another embodiment, all or part of the data in the application matching map 140 can be stored in persistent configuration information within or external to computer 100, i.e. in a table in persistent storage 111 or on the web server 106, and retrieved by the application matching program 120 on initialization or as part of map lookup.

In a specific embodiment, application matching program 120 includes an application switch detection module 148, which, when active, uses a timer 150 to periodically check for foreground window (i.e. the window in which the user is currently working), and notify appropriate application components (filter driver 130 and command dispatcher (not shown)) of an application switch. Application switch detection module 148 may be configured to be active only when it needs to be (for example, when a given user has application-specific event mappings for applications where the software "cares" about full screen windows). Application switch detection module 148 is capable of receiving settings change messages from different configuration components, and updating its concept of whether it "cares" about application switches according to a user's current settings. Thus, for instance, if a user turns off application-specific settings in the control panel, for example, application switch detection module 148 stops its timer 150, thus reducing the overhead the software uses to detect application switch. Using a timer mechanism to detect application switch only when needed can contribute to robust application-specific behavior for mechanical control elements. The design for application matching is easily extensible to accommodate different applications, and the mechanical control element event mapping scheme is easily extensible to accommodate different combinations of behaviors.

Figure 2:
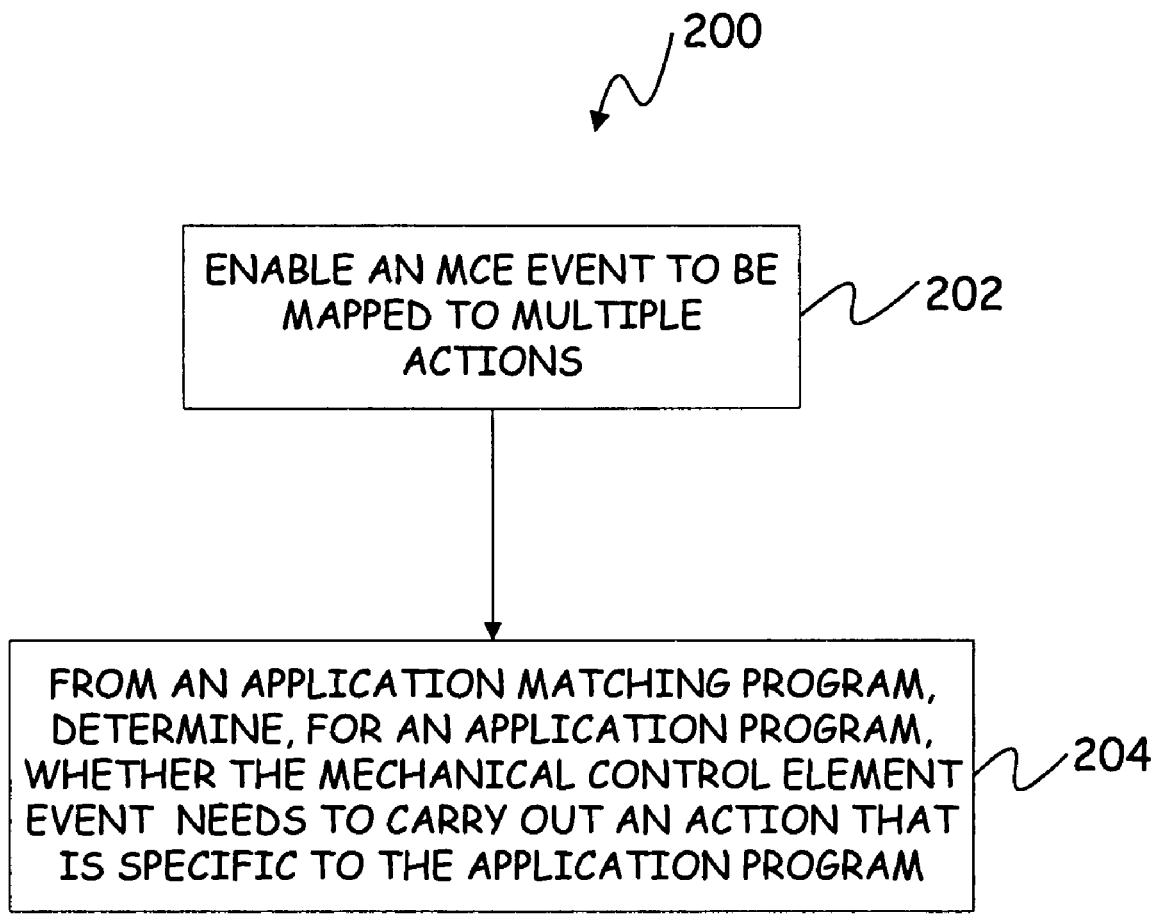
FIG. 2 is a simplified flowchart of a general method embodiment.

Referring now to FIG. 2, a simplified flow diagram 200 is provided to briefly illustrate a general process or method embodiment. A first step in the process involves enabling a mechanical control element event to be mapped to multiple actions. This is illustrated at step 202. It should be noted that one of the multiple actions can include a default action that is not application specific, and other actions can be application specific. Step 204 involves, from an application matching program (such as 120 of FIG. 1), determining, for an application program (such as 118-1), whether the mechanical control element event needs to carry out an action that is specific to the application program (such as 118-1). If an action that is specific to the application program (such as 118-1) does not need to be carried out, then the default action for the mechanical control element event is usually carried out. It should be noted that the application matching program is configured to execute independently of the application program. As noted above, this means that neither the application matching program or the application program are configured in any way to depend on the presence or absence of the other. Installing the application program (or, in general, any application program) on a particular computer before or after the application matching program is installed on the same computer will not in any way interfere with normal operation of the application matching program.

Figure 3A:
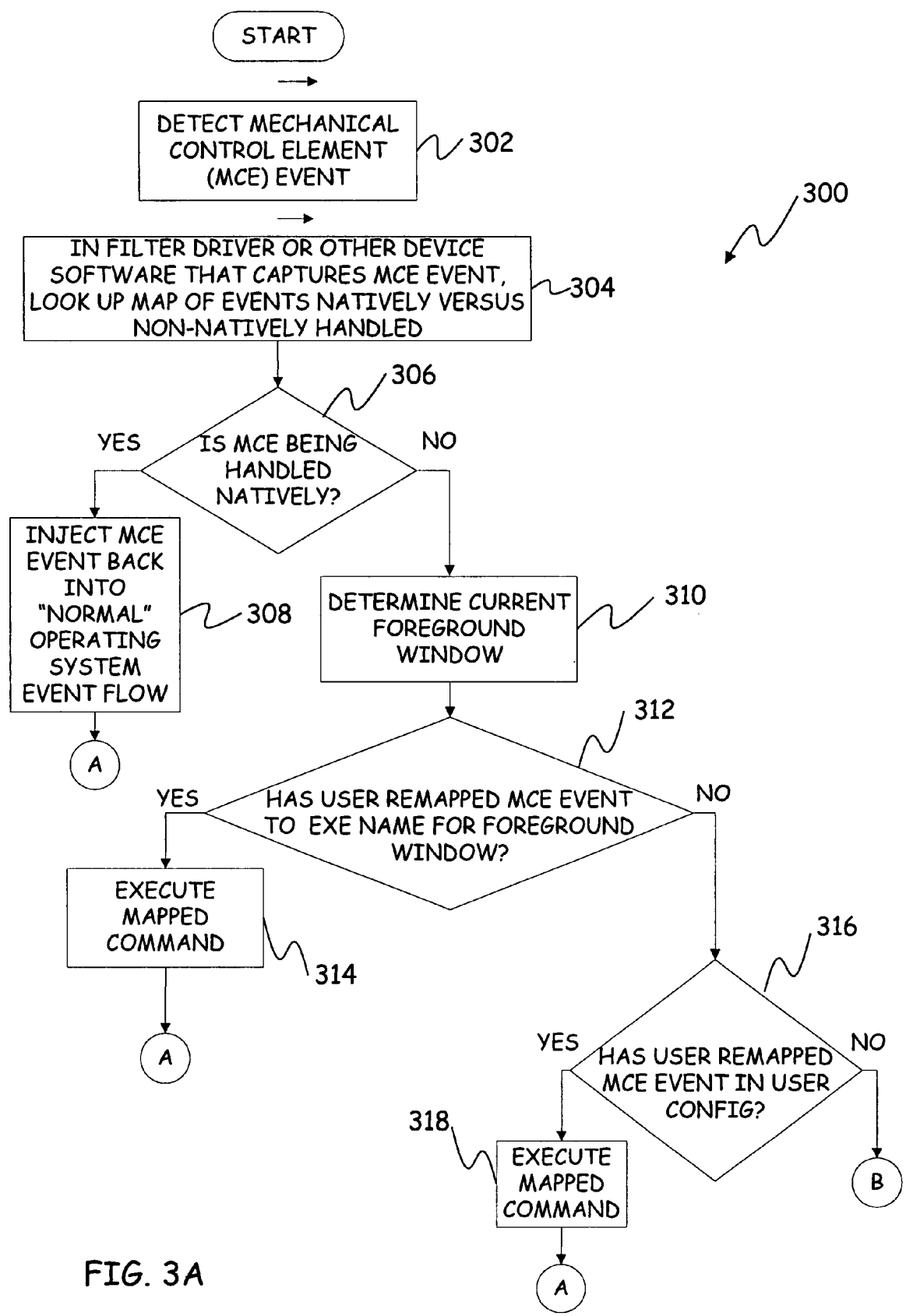
FIGS. 3A and 3B are flowcharts of a more specific method embodiment.
Figure 3B:
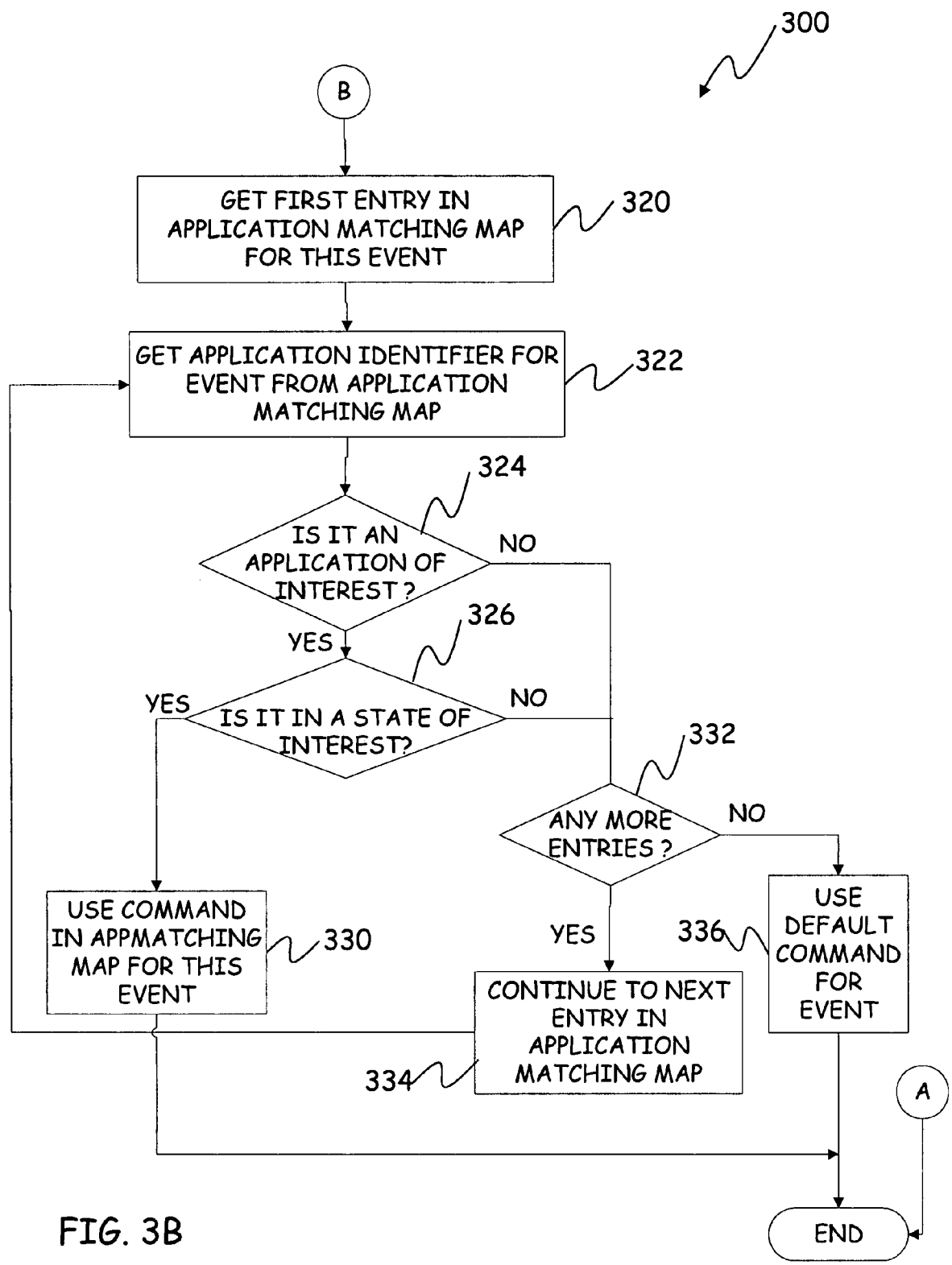

Referring now to FIGS. 3A and 3B, a more detailed flow diagram 300 that illustrates one specific method embodiment is provided. At step 302, a mechanical control element event (for example, a mouse button click event) is detected. At step 304, in a filter driver (such as 116 shown in FIG. 1) or other device software that captures mechanical control element events, a map of events handled natively versus non-natively is looked up and, at step 306, a determination is made as to whether the mechanical control element event is being handled natively. If the mechanical control event is handled natively, it is injected back into "normal" operating system event flow (step 308). This may involve, for example, forwarding the mechanical control element event to a system driver (such as 115 of FIG. 1). In an alternative embodiment where a device has no concept of "native events", or the application matching software can with satisfactory performance replace native handling of events, steps 304, 306, and 308 may be unnecessary, and step 310 will directly follow step 302. If the mechanical control element event is not handled natively, at step 310, the current foreground window, i.e. the window with which the user is currently working, is determined. In another embodiment, depending on the operating system, the element of the active application detected by the application matching software might not be a window per se, but could be another identifier of the application such as another user interface element, or application name, such that the operating system allows querying first the identifier of the application (foreground window in the present example), and from that, obtaining additional information about the currently active application such as name of the executable or window class name. At step 312, a determination is made as to whether the user has re-mapped the mechanical control element event to a command specific to an executable file name for the current foreground window or identifying metadata associated with an active program or active element of active program and exposed by the operating system (e.g. window class name). If the user has, for the currently active application, re-mapped the mechanical control element event to a specific command, that command is executed. This is illustrated at step 314. If the user has not, for the currently active application, re-mapped the mechanical control element event to the specific command, then, at step 316, user configuration information is examined to make a determination as to whether the user has re-mapped the mechanical control element event independent of the currently active application, or for any active application. If, from the user configuration information, it is determined that the user has re-mapped the mechanical control element event, the command to which the user has mapped the mechanical control element event is executed. This is illustrated at step 318. If there is no indication, in the user configuration information, that the user has re-mapped the mechanical control element event, at step 320, a first entry in an application-matching map (such as 140 of FIG. 1) for the mechanical control element event is obtained. At step 322, an application identifier for the mechanical control element event is obtained from the application matching map. At step 324, a determination is made as to whether the application is one of interest for the mechanical control element event. This can involve determining whether the foreground window matches the obtained application identifier. If, for example, the obtained application identifier is an executable file name, the determination as to whether the application is one of interest can be carried out by comparing the executable file name corresponding to the foreground window with the obtained application identifier and determining whether they correspond. Further queries such as version information can be involved at this step. If the application is not one of interest, control passes to step 332, which is discussed further below. If the application is one of interest, a determination is made as to whether it is in a state of interest. This is illustrated at step 326 and can involve determining whether a window of interest in the application program is open, determining whether focus is in that window, determining whether the application program is in an appropriate mode, etc. If the application is in a state of interest, the command in the application matching map for the mechanical control element event is executed. This is illustrated at step 330. If the application is not in a state of interest, a determination is made as to whether there are any entries left for the mechanical control element event in the application matching map. This is illustrated at step 332. If there are no more entries for the event, the default command for the mechanical control element event is used (step 336). If there are more entries in the application matching map for the mechanical control element event, as illustrated at step 334, the process continues to the next entry for the event in the application matching map, and control is passed to step 322. It should be noted that, although steps (320 and 332) related to obtaining a suitable command in from the application matching map for the mechanical control element event and the steps (324 and 326) for determining whether an application is in a state of interest are shown separately, these steps can be suitably combined by, for example, utilizing an executable file name for the foreground window (obtained in earlier steps), for example, to directly search the application matching map for an appropriate action for the mechanical control element event. That is, the same semantic could be achieved using a variety of possible flows of control. In addition, alternative embodiments might include different separation of mapping functionality between different modules and data. For example, more than one application map might be employed, or some or all application maps might be implemented as xml or other files describing the mapping, which would be read by the mapping algorithm into an internal representation of the map, with lookup then proceeding as described above. Another embodiment might add a plug-in mechanism to the mapping scheme. The plug-in mechanism would allow adding application and event mappings to the system after the initial install of the software. The plug-in mechanism would allow mapping files or modules to be added to the system and registered such that the mapping algorithm would then defer part of its operation to plug-ins (e.g. extending the map by adding application/event mappings or sub-algorithms to determine whether an application introduced in the plug-in is in a state of interest).

In addition to the above-described embodiments, some of the present embodiments are especially suited for applications that are designed to support automation, which is a technology that allows a user to take advantage of a program's existing content and functionality and incorporate it into the user's own applications. Automation is often based on the Component Object Model (COM), which is a standard software architecture based on interfaces that are designed to separate code into self-contained objects, or components. Each component exposes a set of interfaces through which communication to the component is handled. For example, a spreadsheet application may expose a worksheet, chart, cell, or a range of cells—each as a different object. A word processor might expose objects such as the application, a document, a paragraph, a sentence, or a bookmark. In general, automation, if exposed, makes it possible for one application to manipulate objects implemented in another application, or to expose their own objects to other programs.

Figure 4:
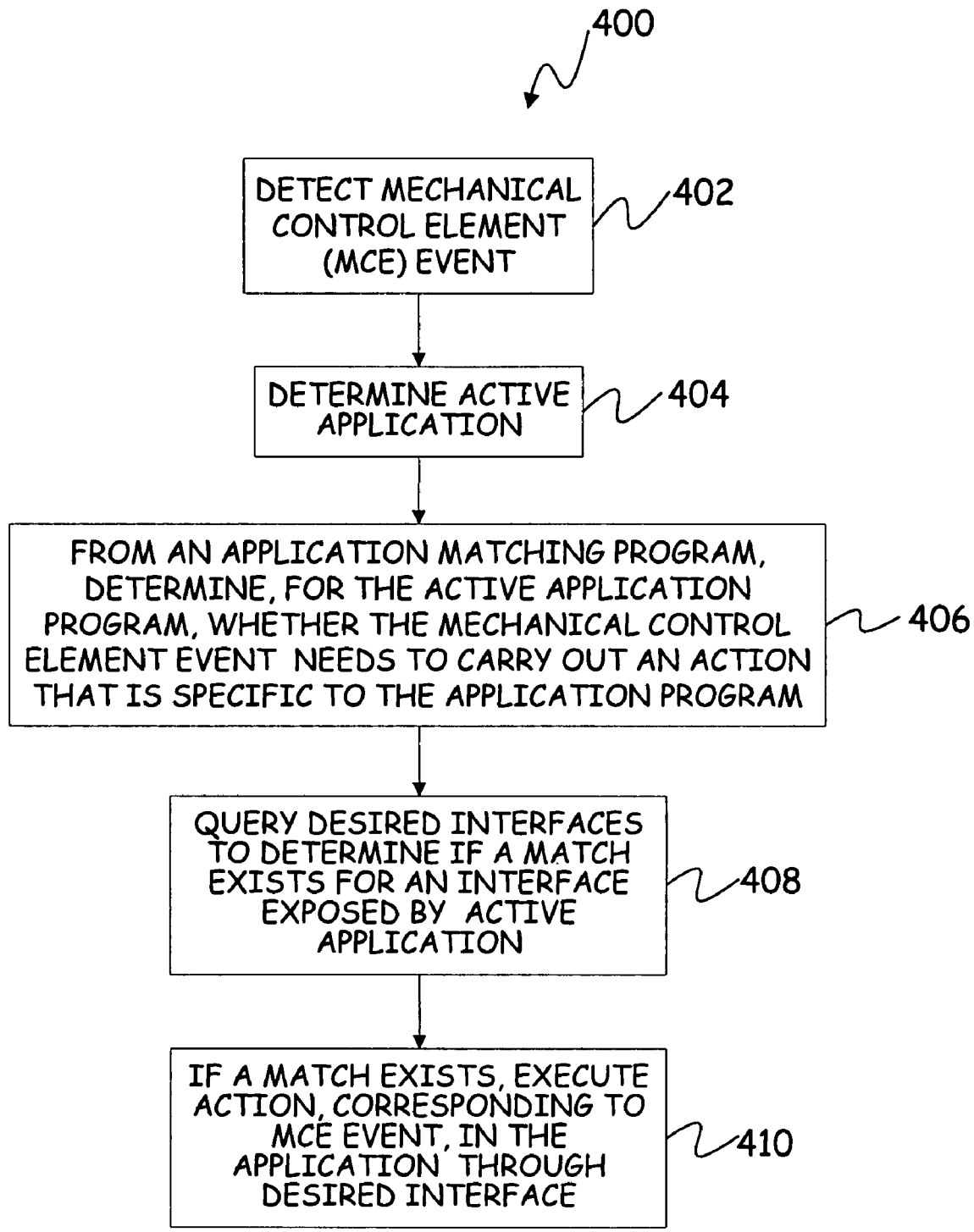
FIG. 4 is a flowchart of another more specific method embodiment.

In accordance with some of the present embodiments, a mechanical control element of a human input device may be used to customize the user experience in a currently running instance of a given application that supports automation. For instance, using automation in the human input device software, a particular mechanical control element may be mapped, when the user is in a particular slideshow presentation software application, to toggle a cursor corresponding to the human input device in a slideshow of the particular application between an arrow cursor and Digital Ink used to draw annotations on a current slide. This ability might be used for features that obviously tie to a particular human input device type, such as using a mouse button to set a mouse cursor, or be used to create a human input device that, with its accompanying software, allows a user to be more productive across a variety of functionality in a particular application or type of application. In any event, an application matching program in accordance with such embodiments will have to carry out steps illustrated in FIG. 4. A first step involves detecting a mechanical control element event (for example, a mouse button click event). This is illustrated at step 402. At step 404, an active application is determined. A determination is then made as to whether the active application is an application of interest for the detected mechanical control element event. This is illustrated at step 406. At step 408, desired interfaces are queried to determine if a match exists for an interface exposed by the active application. If a match exists, an action, corresponding to the mechanical control element event, in the application is executed through the desired interface.

Figure 5:
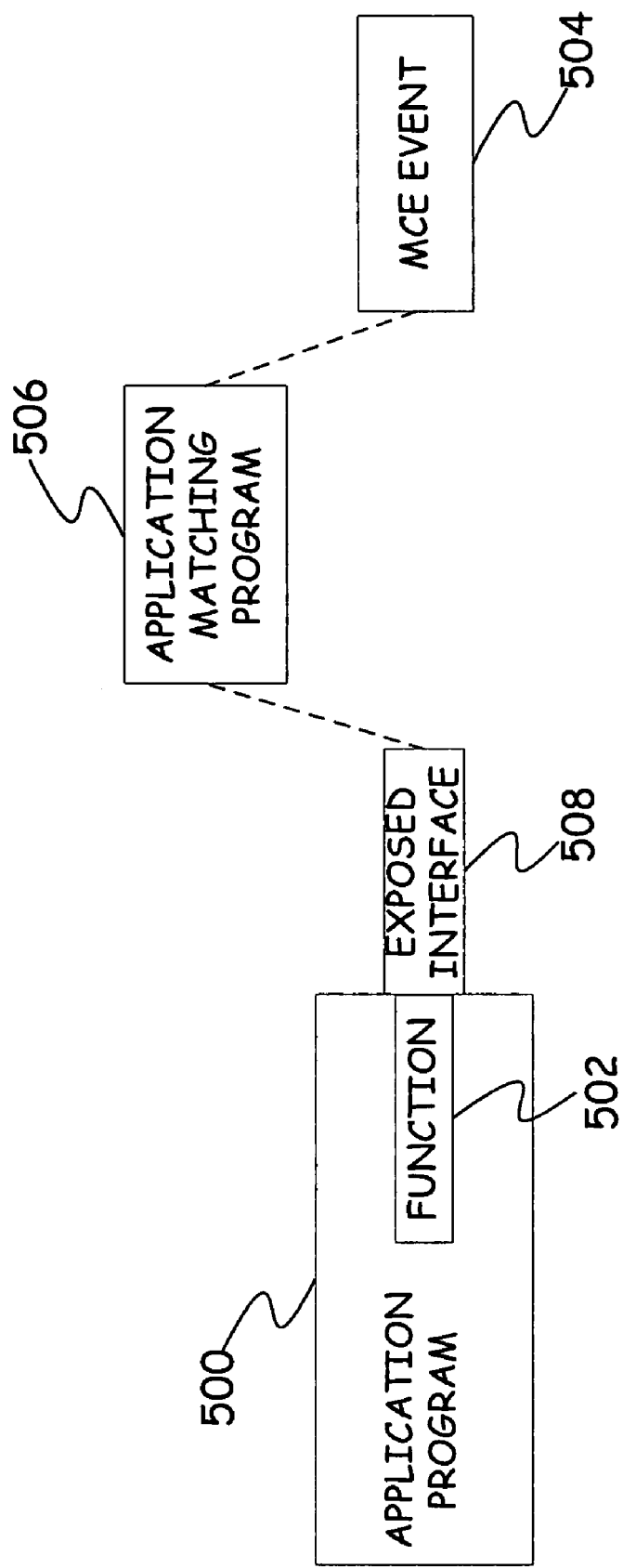
FIG. 5 is a simplified block diagram of one of the present embodiments.

FIG. 5 is a simplified block diagram of another method embodiment. The method involves developing a function (such as 502) in an application program (such as 500) that is capable of exposing the function. The exposed function is associated, by the human interface device software, with a mechanical control element event (denoted by reference numeral 504). FIG. 5 shows how human interface device software may access an exposed function of another application in order to ensure that device events provide appropriately customized user experience when the second application is active. In one embodiment, device software (such as application matching program 506) may opportunistically make use of exposed interfaces (such as 508) of an application program (such as 500). In another embodiment, designers of device software and application software could collaborate such that the application software exposes interfaces that allow the device software to enhance the user's experience of using the device in concert with the application software. In yet another embodiment, designers of device software would publish a COM interface specification or other interface specification. Then any third party application would be free to implement the specification. For each piece of applicable application software that implemented the interface, device software would perform the desired action in the third party application. This embodiment would enable application software developers to, by implementing appropriate interfaces, ensure a great user experience when the particular device is used with their application software.

In summary, the above-described embodiments provide software that detects each time the user switches from one application to another. On application switch, the software detects the current application. Each time a mechanical control element event that the user has not remapped for either current application or in general occurs, the software checks its map and business logic pertinent to the combination of application and mechanical control element event to determine whether it needs to perform its default or a different behavior that is specific to the current application.

Although the above-described embodiments relate to human input devices and mechanical control elements such as buttons and keys included in the human input devices, the teachings and principles of the disclosure are applicable to substantially non-human input devices and also applicable to other types of mechanical and non-mechanical control elements. Thus, alternate embodiments can include different types of mechanical control (e.g. sliders, dials), devices that are not primarily human interface devices (e.g. speakers, thermostats), target applications that achieve the same functionality in different ways (e.g. two different brands of word processing application that expose different interfaces to device software), and different kinds of target applications (e.g. a thermostat event that can invoke useful actions in both furnace control software and smoke alarm software). Control elements that are not mechanical from the point of view of the device are included, for example, in a gesture based system in which human gestures are observed and interpreted by an optical sensor and associated software would still generate events associated with gestures, and these events could also invoke diverse functionality in diverse software applications in the manner described earlier.

In general, the present embodiments relate to a method for carrying out application-specific mapping of input device elements. The method includes, from an application matching program, determining, for an application program, whether a control element event needs to carry out an action that is specific to the application program, or to perform its default action. The application matching program is configured to execute independently of the application program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implementable in a computer, the method comprising:
   receiving a control element event with the help of a controller of the computer;
   determining, within the computer and with the help of the controller of the computer, whether the control element event is to be handled natively; and
   if the control element event is not to be handled natively, detecting a currently active application program running in the computer with the help of the controller of the computer, and determining, in an application matching program running in the computer with the help of the controller of the computer, whether the control element event is used to carry out an action that is specific to the currently active application program,
   wherein the application matching program is configured to execute in the computer independently of the application program, and
   wherein the application program is installable in the computer with the help of the controller of the computer at any time during a period that includes a duration before installation of the application matching program in the computer and a duration after installation of the application matching program in the computer.

2. The method of claim 1 wherein detecting the currently active application program comprises identifying a foreground window.

3. The method of claim 1 and further comprising utilizing a default action for the control element event if the control element event is not used to carry out an action that is specific to the application program.

4. The method of claim 1 and further comprising determining whether the control element event is re-mapped independently of the application program and, if the control element event is not re-mapped, determining, in the application matching program, whether the control element event is used to carry out an action that is specific to the application program.

5. The method of claim 4 and further comprising, if the control element event is re-mapped to a command that is specific to one of an executable file name and identifying metadata, executing the command.

6. The method of claim 4 and further comprising, if the control element event is re-mapped through user configuration information, executing a corresponding command for the control element event in the user configuration information.

7. The method of claim 1 and further comprising determining whether the application program has application-specific behavior for at least one control element event and, if the application program has application-specific behavior for at least one control element event, determining: in the application matching program, whether the control element event is used to carry out an action that is specific to the application program.

8. The method of claim 7 and further comprising utilizing a default action for the control element event if the application program does not have application-specific behavior for the control element event.

9. The method of claim 1 and further comprising processing the control element event independently of the application matching program if it is to be handled natively.

10. The method of claim 1 wherein determining, in an application matching program, whether a control element event is used to carry out an action that is specific to the application program comprises determining, in the application matching program, whether an interface exposed by the application program corresponds with an interface identifier associated with the control element.

11. The method of claim 10 and further comprising, if the interface exposed by the application program corresponds with the interface identifier associated with the control element, carrying out an action, associated with the control element event, that is specific to the application program.

12. A computing system comprising:
    an input device having at least one control element; and
    a computer having a memory that is configured to store application programs, an application matching program, and actions corresponding to a control element event for the control element, the computer further comprising a controller,
    wherein the computer is configured to receive, with the help of the controller, the control element event and to responsively:
      determine, with the help of the controller, whether the control element event is to be handled natively; and
      if the control element event is not to be handled natively, detect at least one application program running on the computer with the help of the controller, and determine, using the application matching program running on the computer with the help of the controller, whether the control element event is used to carry out an action that is specific to the at least one application program;
    wherein the application matching program is configured to execute in the computer independently of the application program, and
    wherein the application program is installable in the computer with the help of the controller of the computer at any time during a period that includes a duration before installation of the application matching program in the computer and a duration after installation of the application matching program in the computer.

13. The system of claim 12 wherein the input device is a mouse and the control element is a specialized button of the mouse.

14. A method, implementable in a computer, the method comprising:
    developing a function in an application program that is capable of exposing the function;
    associating the developed function with a control element event; and
    providing an application matching program that is capable of linking the exposed function with the control element event using an interface that is exposed by the application program,
    wherein the application program is detected only when non-natively handled control element events are received in the computer in which the application program and the application matching program run, and
    wherein the application matching program is configured to execute in the computer independently of the application program, and
    wherein the application program is installable in the computer with the help of a controller of the computer at any time during a period that includes a duration before installation of the application matching program in the computer and a duration after installation of the application matching program in the computer.

15. The method of claim 14 wherein the application matching program is configured to execute independently of the application program.

16. The method of claim 14 wherein the application program exposes functionality through COM (Component Object Model).

17. A computing system configured to implement the method of claim 14.

* * * * *

UNITED STATES PATENT AND TRADEMARK OFFICE
CERTIFICATE OF CORRECTION

| | | |
|---|---|---|
| PATENT NO. | : 7,631,124 B2 | Page 1 of 1 |
| APPLICATION NO. | : 11/784223 | |
| DATED | : December 8, 2009 | |
| INVENTOR(S) | : Alice Lockhart et al. | |

It is certified that error appears in the above-identified patent and that said Letters Patent is hereby corrected as shown below:

In column 9, line 57, in Claim 7, delete "determining:" and insert -- determining, --, therefor.

In column 10, line 32, in Claim 12, delete "program:" and insert -- program, --, therefor.

Signed and Sealed this

Eighteenth Day of January, 2011

David J. Kappos
*Director of the United States Patent and Trademark Office*